United States Patent [19]
Stein et al.

[11] Patent Number: 4,954,364
[45] Date of Patent: Sep. 4, 1990

[54] METHOD FOR COATING SUBSTRATES WITH UV CURABLE EPOXYSILICONE COMPOSITIONS

[75] Inventors: Judith Stein, Schenectady, N.Y.; Tracey M. Leonard, Essex Junction, Vt.; James L. Desorcie, Clifton Park, N.Y.

[73] Assignee: General Electric Company, Schenectady, N.Y.

[21] Appl. No.: 369,799

[22] Filed: Jun. 22, 1989

[51] Int. Cl.$^5$ .............................................. B05D 3/06
[52] U.S. Cl. .................................. 427/54.1; 427/386; 427/387; 522/31; 522/148; 522/170; 528/12; 528/29; 528/33
[58] Field of Search ................... 427/54.1, 386, 387; 522/31, 148, 170; 528/12, 29, 33

[56] References Cited
U.S. PATENT DOCUMENTS

| | | | |
|---|---|---|---|
| 4,448,815 | 5/1984 | Grenoble et al. | 427/387 |
| 4,547,431 | 10/1985 | Eckberg | 428/413 |
| 4,576,999 | 3/1986 | Eckberg | 525/476 |

*Primary Examiner*—Michael Lusignan
*Attorney, Agent, or Firm*—William A. Teoli; James C. Davis, Jr.; William H. Pittman

[57] ABSTRACT

A method is provided for enhancing the controlled release characteristics of paper or plastic substrates by applying onto the substrate, a UV curable mixture of an epoxysilicone, an arylonium salt catalyst, such as a diaryliodoniumhexafluoroantimonate and a controlled release additive such as a phenolpropyl-substituted methyldisiloxane or an alkylphenol, such as dodecylphenol. The treated plastic or paper substrate is then subjected to UV irradiation to effect a tack-free cure of the UV curable mixture on the substrate.

8 Claims, No Drawings

METHOD FOR COATING SUBSTRATES WITH UV CURABLE EPOXYSILICONE COMPOSITIONS

CROSS REFERENCE TO RELATED APPLICATIONS

Reference is made to copending applications of Riding et al., Ser. No. 225,986, filed July 29, 1988, for Silicone Release Coating Compositions, Eckberg et al., 60SI1267, filed on or about Apr. 3, 1989, for Ultraviolet Radiation Curable Epoxysilicone/Polyol Systems, application RD-19341, Desorcie et al., filed concurrently herewith for UV Curable Non-Toxic Epoxy-Silicone Release Coating Compositions, and application RD-19,492 Stein et al., filed concurrently herewith for Substantially Odor-Free, UV Curable Organopolysiloxane Release Coating Compositions and Coating Method, where all of the aforementioned application are assigned to the same assignee as the present invention and incorporated herein by reference.

BACKGROUND OF THE INVENTION

The present invention relates to a method for imparting controlled release characteristics to a plastic or paper substrate resulting from the UV cure of a UV curable epoxysilicone composition. More particularly, the present invention relates to the use of UV curable epoxysilicone compositions having a particular amount of a control release additive, such as a $C_{(8-16)}$ alkylphenol, or an alkylphenol substituted disiloxane incorporated therein.

Prior to the present invention, silicone release coatings were widely used to render various surfaces non-adherent. Non-adherent silicone treated paper is often used to support labels contacting a pressure-sensitive adhesive (PSA) prior to the use of such labels. In addition, non-adherent surfaces are often necessary in industrial packaging.

Silicones have been widely recognized for their value as release coatings particularly with respect to their use with PSAs. The release coating industry is also searching for ways to synthesize release coating compositions which can be converted to cured release coatings having a predictable variation in release characteristics when contacted with PSAs, referred to hereinafter as "controlled or differential release".

Certain coating compositions utilizing epoxy or acrylic functional groups as modifiers of the release properties of cured silicone resins are taught by U.S. Pat. No. 4,576,999. UV cured epoxysilicone polymers having controlled release are discussed in copending application Ser. No. 171,498, filed Mar. 21, 1988, utilizing condensed organosiloxy units substituted with esterified benzoyl groups. Another method for modifying release characteristics of UV curable epoxy functional silicones is taught in U.S. Pat. No. 4,547,431, resulting from the addition of epoxy monomers.

Controlled or differential release of organopolysiloxane resins is also discussed in copending application Ser. No. 225,986, filed July 29, 1988. Organopolysiloxanes are modified with monovalent phenolic radicals having from 6 to 26 carbon atoms, monovalent acrylic organic radicals, or monovalent epoxy functional organic radicals. These modified silicones have been found to have controlled release. The incorporation of the phenolic groups onto the organopolysiloxane backbone is achieved by an SiH to vinyl addition reaction catalyzed by a platinum catalyst. Although effective controlled release results are achieved, it has been found that residual amounts of unreacted allylphenol used to incorporate phenolic groups into the resin, often impart an undesirable phenolic odor to the silicone release resin.

SUMMARY OF THE INVENTION

The present invention is based on the discovery that the addition to an epoxysilicone, of low molecular weight additives, such as a $C_{(8-20)}$ alkylphenol, or an alkylphenol substituted disiloxane, can impart a high degree of control over the release characteristics of certain cured epoxysilicone compositions as defined hereinafter, with respect to the force in grams/in needed to separate a PSA treated substrate from such cured epoxysilicone surface. Advantageously, no SiH addition to a high molecular weight silicone is required, and the cured silicone release coatings have been found to be substantially free of undesirable phenolic odor due to unreacted allylphenol.

STATEMENT OF THE INVENTION

There is provided by the present invention, a substantially odor-free method for imparting controlled release characteristics to paper or plastic substrate, which comprises,
(A) treating the paper or plastic substrate with a UV curable epoxysilicone mixture, and
(B) UV curing the treated substrate until a nonsmear tack-free adherent film is formed,
where the UV curable epoxysilicone mixture comprises by weight,
(C) 100 parts of epoxysilicone having from about 5 to 12 mole percent of chemically combined epoxyorganosiloxy units based on the total moles of chemically combined diorganosiloxy units,
(D) an effective amount of a photosensitive polyaryloniumhexafluorometalloid salt and
(E) 1 to 50 parts of a controlled release additive selected from the class consisting of
(i) $C_{(8-20)}$ alkylphenols
(ii) phenolalkyl substituted organodisiloxanes.

The polyaryloniumhexafluorometalloid salts which can be used in the practice of the present invention include group VIa aromatic sulfonium salts as shown by U.S. Pat. No. 4,058,401 and U.S. Pat. No. 4,161,478, Crivello, which are incorporated herein by reference and diaryliodoniumhexafluoro metalloid salts shown by Crivello U.S. Pat. No. 4,173,551 which is incorporated herein by reference.

Some of the triarylsulfonium salts are, for example, triphenylsulfoniumhexafluoroarsenate, triphenylsulfoniumhexafluoroantimonate and triarylsulfoniumhexafluorophosphate. Among the diaryliodonium salts which can be used are, for example, diphenyliodoniumhexafluoroarsenate, and diphenyliodoniumhexafluorophosphate. In addition to the aforementioned arylonium salts, there also can be used arylonium salts selected from the class consisting of hexafluorophosphates, hexafluoroarsenates and hexafluoroantimonates having at least one aryl radical substituted with a nuclear bound —OR group attached to the aryl nucleus by a carbonoxygen linkage, where R is an alkyl radical having at least 8 carbon atoms. Reference is made to copending application Ser. No. 171,063, filed Mar. 21, 1988 for Non-Toxic Aryl Onium Salts, UV Curable Coating Compositions and Packaging Use, Crivello et al., which is incorporated herein by reference, which shows additional polyaryloniumhexafluorometalloid salts which can be employed in the practice of the present invention. An effective amount of the aryl onium salts which can be used is, for example, from 0.1% to 2% by weight and preferably 0.25% to 1% by weight based on the weight of release coating composition.

Epoxysilicones used in the practice of the present invention can be made by effecting reaction between epoxide monomers having ethylenic unsaturation and an organohydrogen polysiloxane in the presence of a catalytic amount of a precious metal such as a platinum catalyst. Included within the ethylenically unsaturated epoxy monomers which can be employed to make the epoxysilicones used in the practice of the present invention are commercially available materials such as 1-methyl-4-isopropenylcyclohexene oxide, 2,6-dimethyl-2,3-epoxy-7-octene, 1,4-dimethyl-4-vinylcyclohexene oxide and vinylcyclohexene monoxide. Vinylcyclohexene oxide is the preferred ethylenically unsaturated epoxide which can be used.

Addition between the ethylenically unsaturated epoxide and the SiH functional groups of the organohydrogenpolysiloxane can be effected in accordance with the procedure shown by Eckberg U.S. Pat. No. 4,279,717, employing an effective amount of a platinum metal catalyst. In order to maintain the desired mole percent range of epoxy functionality in the epoxy-silicone, as set forth in the Statement of the Invention, there can be used various organohydrogenpolysiloxanes which preferably are methylhydrogenpolysiloxane fluids. For example, in instances where the 10 mole percent of epoxy functionality is required, a methylhydrogenpolysiloxane having a chain length of about 100 chemically combined siloxy units consisting essentially of about 90 mole percent of dimethylsiloxy units, 8 mole percent of methylhydrogensiloxy units chain-stopped with dimethylhydrogensiloxy units can be used. In instances where higher mole percents of epoxy functionality are desired, methylhydrogen polysiloxane having a shorter chain length of methylhydrogen siloxy units and dimethylsiloxy units and optionally having dimethylhydrogensiloxy chain-stopping units can be used. In instances where lower mole percents of epoxy functionality in the epoxy silicone are desired, methylhydrogenpolysiloxanes having longer chain lengths can be employed.

Control release additives "CRA's" as set forth in the Statement of The Invention which have been found effective are, for example, commercially available $C_{(8-16)}$ alkylphenols, for example, dodecylpenol and nonylphenol. Additional alkylphenols which are not commercially available can be made by the procedure shown by Hinds, Petroleum-Based Raw Materials for Anionic Surfactants, "Anionic Surfactants", Part 1, Warner M. Linfield, Marcel Decker Inc., New York 1976, which is incorporated herein by reference.

Some of the preferred phenolalkyl substituted organodisiloxanes of the present invention are included within the formula

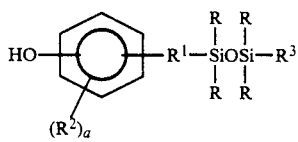

where R is selected from the same or different $C_{(1-13)}$ monovalent hydrocarbon radicals and $C_{(1-13)}$ monovalent hydrocarbon radicals substituted with radicals inert during condensation, $R^1$ is a $C_{(3-8)}$ alkylene radical, $R^2$ is a $C_{(1-8)}$ alkyl radical, $R^3$ is a member selected from R and

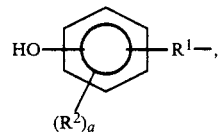

and a is equal to 0 to 2 inclusive.

Radicals included with R are for example $C_{(1-8)}$ alkyl such as methyl, ethyl, propyl and butyl; $C_{(6-13)}$ monovalent aryl radicals, such as phenyl, xylyl and tolyl and halogenated derivatives thereof. Radicals included within $R^1$ are for example propylene and butylene and $R^2$ can be methyl, ethyl, etc.

Coating compositions of the present invention can be applied to various substrates b conventional means such as by roller coating, spraying and dip coating. The silicone release compositions can be applied, for example, on paper, metals, foils, glass, as well as polymer coated papers such as polyolefin coated kraft paper, polyolefin films, such as polyethylene and polypropylene films and polyester films.

Cure of the applied coatings can be effected by photopolymerization of the UV curable epoxysilicone compositions upon exposure to a radiation source within the ultraviolet and visible regions. Some of the radiation sources are, for example, mercury, xenon, carbon arc and tungsten filament lamps, sunlight, etc. Exposures can be from less than one second to 10 minutes of more depending upon the materials to be polymerized and photocatalysts employed. Electron beam irradiation also can be used.

In order that those skilled in the art will be better able to practice the present invention, the following examples are given by way of illustration and not by way of limitation. All parts are by weight unless otherwise specified.

EXAMPLE 1

Several phenolpropyl-substituted disiloxanes were prepared in accordance with the following procedures:

There was added dropwise, 20.0 grams of 2-allylphenol to a mixture heated to 65° C. consisting of 10 grams of tetramethyldisiloxane, 5 ml of toluene and 2 drops of a platinum catalyst shown by Lamoreaux U.S. Pat. No. 3,220,972, consisting of 2.8% platinum in octanol. The mixture was heated for several hours to effect addition between the disiloxane and the allylphenol and was monitored by IR and GC. The product was isolated by vacuum distillation. Based on method of preparation, the product was 1,3-propylphenoltetramethyldisiloxane. It was obtained at a quantitative yield.

The above procedure was repeated, except that there was used 10 grams of pentamethyldisiloxane and 9.05 grams of 2-allylphenol. Based on method of preparation, there was obtained phenolpropylpentamethyldisiloxane in quantitative yield.

There was added dropwise, 11.8 grams of 2-allylphenol to mixture heated to 65° C. with stirring consisting of 50 grams of a methylhydrogenpolysiloxane consisting essentially of an average of about 20 dimethylsiloxy units, about 3 methylhydrogensiloxy units and chain-stopped with trimethylsiloxy units, 25 ml of toluene and 2 drops of the platinum catalyst used above. The mixture was heated for 2 hours prior to addition of one gram of hexene. There was then added 0.1 gram of tetramethylurea and 0.1 gram of dodecanethiol which was added to inactivate the platinum catalyst. The solvent was removed in vacuo and light ends were removed by heating in vacuo at 120° C. Based on method of preparation, there was obtained a phenolpropyl-substituted polydimethylsiloxane having an average of 20 condensed dimethylsiloxy units ($D_{20}$).

The above CRAs, namely the 1,3-phenolpropyltetramethyldisiloxane, and phenolpropylpentamethyldisiloxane were blended in various ratios with a poly(dimethylmethylepoxycyclohexylethyl)siloxane having a viscosity of about 250 centipoise at 25° C. and 7 mole percent of condensed methylepoxycyclohexylethylsiloxy units to produce a variety of UV curable silicone release compositions. The various UV curable epoxysilicone compositions were then diluted to 20% by weight solids with acetone/hexane and catalyzed with 1-3% by weight of (4-octyloxyphenyl)phenyliodoniumhexafluoroantimonate. The various release coating compositions were then applied to polyethylene Kraft using a coating rod, dried and cured by exposure to a mercury vapor lamp at 200 watts/in at 50 feet per minute. A coating of a PSA, Bondmaster 36-6157 rubber based adhesive from National Starch and Chemical Corp. of Bridgewater, New Jersey was then applied followed by a super-calendered kraft (SCK) face stock. Release data were obtained by separating the silicone coating and PSA using a Testing Machines Inc. release and adhesion tester at 300 inches/min. and 180 pull angle. The release was measured in units of g/2 inches. The following results were obtained where "CRA" is the above described disiloxane controlled release additives, and "epoxysilicone" is the epoxycyclohexylethyl-substituted polydimethylsiloxane. The phenolpropyl-substituted silicone fluid "silicone fluid ($D_{20}$)" having an average of about 20 chemically combined dimethylsiloxy units and about 3 chemically combined methylpropylphenolsiloxy units was also evaluated.

TABLE 1

| CRA (phenol propyl substituted) | Grams of CRA per Gram of Epoxy Silicone | Release (1 day) |
| --- | --- | --- |
| tetramethyldisiloxane | .16 | 105-115 |
| " | .24 | 250-260 |
| ppentamethyldisiloxane | .11 | 75-85 |
| " | .22 | 110-115 |
| " | .33 | 145-155 |
| silicone fluid ($D_{20}$) | 1 | 160-170 |
| control | — | 45-55 |

The above results show that improved adhesion is achieved using the respective CRAs at different concentrations as compared to the control free of the CRA. It was further found that the release composition containing the $D_{20}$ silicone fluid had a residual odor of allylphenol which was absent in the disiloxane containing epoxysilicone compositions. A possible explanation is that residual unreacted allylphenol was more easily separated by distillation from the phenolpropyl substituted disiloxanes.

EXAMPLE 2

A poly(dimethyl-methylepoxycyclohexylethyl)siloxane having an average of about 11 mole percent of chemically combined methylepoxycyclohexylethylsiloxy units was blended with various proportions of dodecylphenol or nonylphenol as CRAs. The blends were diluted to 20% by weight of solids with acetone/hexane solvent and catalyzed at 3 weight percent of a 1:1 mixture of (4-octyloxyphenyl)phenyliodoniumhexafluoroantimonate and 2-ethyl-1,3-hexanediol. A coating was applied to polyethylene kraft using a coating rod and dried and cured by exposure to a mercury vapor lamp at 200 watts/in at 100 feet per minute. Lamination and testing was carried out in accordance with Example 1. Release of the laminate was measured after a 4 week shelf period in units of grams/2 inch. The following results were obtained, where CRA is controlled release additive:

TABLE II

| CRA (parts) | | Release data |
| --- | --- | --- |
| Dodecylphenol | 0.1 | 60-70 |
| | 0.2 | 105-115 |
| | 0.3 | 160-170 |
| | 0.4 | 190-200 |
| nonylphenol | 0.02 | 40-50 |
| | 0.1 | 80-90 |
| | 0.2 | 155-165 |

The above results show that a substantially linear relationship exists between the concentration of the CRA and the UV curable epoxy-silicone and the release obtained in the resulting UV cured coating.

Although the above Examples are directed to only a few of the very many variables which can be used in the practice of the method of the present invention, it should be understood that a much broader variety of UV curable epoxy compositions can be used resulting from the employment of other epoxysilicones, phenolpropyldisiloxanes and alkyl phenols, such as shown in the description preceding these examples.

What is claimed is:

1. A method for imparting control release characteristics to a paper or plastic substrate, which comprises,
   (A) treating the paper or plastic substrate with a UV curable epoxysilicone mixture, and
   (B) UV curing the treated substrate until a nonsmear tack-free adherent film is formed,
   where the UV curable epoxysilicone mixture comprises by weight,
   (C) 100 parts of epoxysilicone having from about 5 to 12 mole percent of condensed epoxyorganosiloxy units based on the total moles of condensed diorganosiloxy units,
   (D) an effective amount of a photosensitive polyaryloniumhexafluorometalloid salt and
   (E) 0.1 to 50 parts of a member selected from the class consisting of
      (i) $C_{(8-20)}$ alkyl phenols
      (ii) phenolalkyl substituted organodisiloxanes.

2. A method in accordance with claim 1, where the epoxysilicone consists essentially of chemically combined dimethylsiloxy units and methylepoxycyclohexylethylsiloxy 3. A method in accordance with claim 1, where the controlled release additive is a phenolpropyl-substituted polymethyldisiloxane.

4. A method in accordance with claim 1, where the controlled release additive is dodecylphenol.

5. A method in accordance with claim 1, where the iodonium catalyst is (4-octyloxyphenyl)phenyliodoniumhexafluoroantimonate.

6. A method in accordance with claim 1, where the controlled release additive is nonylphenol.

7. A method in accordance with claim 3, where the controlled release additive is a tetramethyldisiloxane.

8. A method in accordance with claim 3, where the controlled release additive is a pentamethyldisiloxane.

* * * * *